July 22, 1930.  C. P. KRAMER  1,771,382
LOCK
Filed May 20, 1929
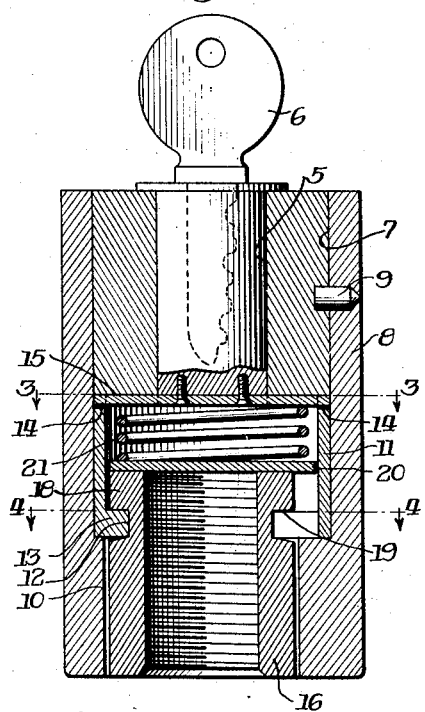
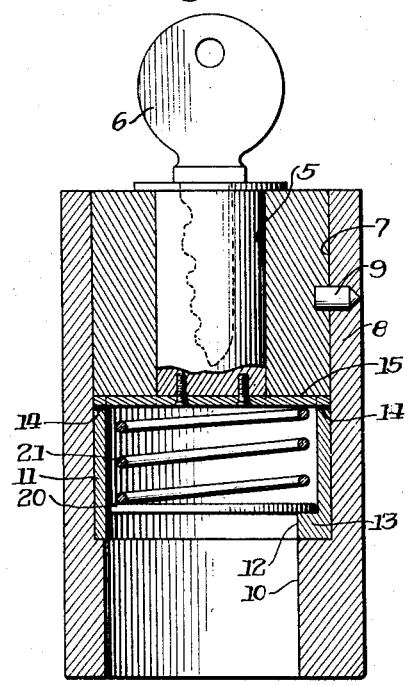
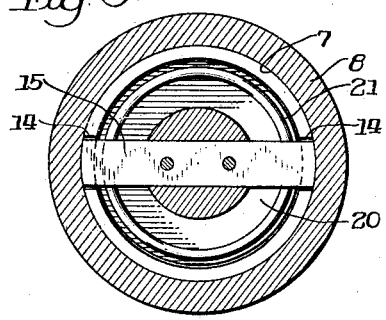
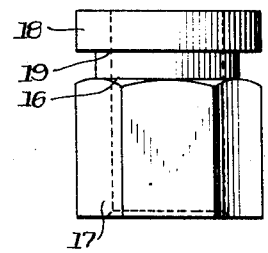
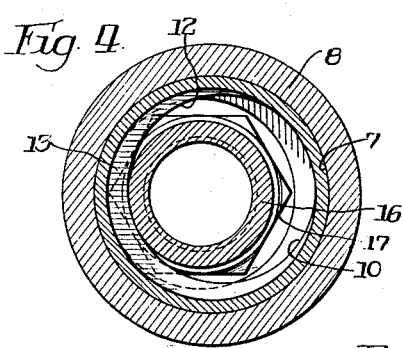
Inventor;
Clarence P. Kramer
By Kent W. Nourrell Atty.

Patented July 22, 1930

1,771,382

UNITED STATES PATENT OFFICE

CLARENCE P. KRAMER, OF CHICAGO, ILLINOIS, ASSIGNOR TO THOMAS A. HARBICK, OF CHICAGO, ILLINOIS

LOCK

Application filed May 20, 1929. Serial No. 364,387.

This invention relates in general to a key operated lock but has more particular reference to a nut lock for spare automobile tires. One of the principal objects of the invention is to provide a lock in which the lock parts may be easily and quickly machined and made upon an automatic screw machine.

A further object of the invention is in the provision of a lock in which the lock cylinder is eccentrically bored from opposite ends to receive cooperating cylindrical parts fitting the eccentric bearings and interengaging by their relative rotation.

A further object of the invention is to so simplify the construction of a lock and reduce the number of essential working parts that it can be made and assembled quickly and inexpensively.

Other objects of the invention will appear hereinfter, the accompanying drawing illustrating a preferred embodiment of the invention.

In the drawing Fig. 1 is a sectional view of a lock constructed in accordance with the principles of this invention with a nut to be locked in position; Fig. 2 is a sectional view of the lock and the nut with the nut removed; Fig. 3 is a section taken on the line 3—3 of Fig. 1; and Fig. 4 is a section taken on the line 4—4 of Fig. 1.

In locking a spare tire for an automobile to prevent the theft of the tire, a key operated nut lock is commonly provided which controls a nut for locking the tire and its rim to a tire holding frame attached as a part of the autmobile or its chassis. The present invention relates to a simple and improved lock for this purpose.

Heretofore it has been the practice to make locks of this kind of large pieces or castings which required special machining and special tools, and the parts thus produced were not only expensive but difficult to assemble and objectionably heavy and cumbersome in appearance.

The present invention overcomes these objections by providing a simple cylinder or barrel slightly larger in diameter than the nut which it is to lock and slightly longer than the length of the nut and the tumbler of the lock.

Referring more particularly to the drawing, a lock 5 of any well known rotatable type operated by a key 6 is inserted in a bore 7 at one end of a cylinder body 8 where the lock body is held in place by a key 9 pointed at the outer end so that it is not easily removed.

At the other end of the cylinder body 8 is a cylindrical bore 10 eccentric with respect to the other bore 7 and slightly less in diameter. Seated at the inner end of the bore 7 is a hollow bushing 11 having a smaller eccentric bore 12 at one end forming a locking ring 13 at the inside of this end of the bushing. At the other end of the bushing are opposite notches 14 engaged by a transverse drive piece 15 which is attached to the inner end of the rotatable barrel of the lock 5 so that the rotation of the key 6 and the barrel will cause a corresponding rotation of the bushing 11 and the locking ring 13.

A locking nut 16 has a wrench engaging portion 17 for the major portion of its length with a circular head 18 supported therefrom by a groove 19. This groove 19 is of the proper width to receive the locking ring 13 when the nut 16 is inserted in the lock cylinder 8 and when the key turns the bushing 11 to one position, as shown in Fig. 1. The nut 16 is engaged against removal, and when the key turns the bushing to another position, as shown in Fig. 2, the nut is freely removable from the cylinder body the bore 12 of the bushing 11 substantially coincides with the bore 10.

In order to close the opening in the bushing 11 against the entrance of anything objectionable when the nut is removed, a plate 20 is inserted in the bushing 11, and a spring 21 is interposed between it and the drive piece 15, tending to hold the plate 20 tightly against the inside of the locking ring 13 of the bushing. When the nut 16 is inserted, the plate 20 is engaged and the spring 21 is compressed, as shown in Fig. 1.

With this construction the nut 16 is easily inserted and removed and is positively locked and secured in position. The entire lock is constructed of parts which are easily machined; and being principally circular in form are easily assembled and not likely to get out of order or displaced in the cylinder body.

I claim:

1. A nut lock comprising a cylindrical body having eccentric bores at opposite ends, one bore for receiving a nut to be locked at one end, a lock barrel mounted in the body at the other end, and eccentric means operated by the lock barrel for engaging a nut inserted in the said bore for receiving it.

2. In a nut lock of the class described, a body having opposite eccentric bores, a key operated lock having an eccentric locking ring, the ring being movable by the lock to engage the groove of a locking nut inserted in the opposite bore of the body.

3. A nut lock for nuts having a locking groove at one end comprising a body with opposite eccentric bores, one of which is adapted to receive a nut to be locked, locking means secured in the opposite bore of the body and including a driving member at its inner end, and an eccentric bushing having a locking ring at one end adapted to engage the groove of a nut inserted in the body and having notches at the other end to engage the driving member of the lock whereby the eccentric ring is rotated with the locking member.

4. A nut lock comprising a body having opposite eccentric bores, locking means secured in one of the bores and having a driving member at its inner end, a bushing rotatable in this bore engaged by the driving member for rotation and having an eccentric bushing at the other end, and a locking nut with a groove engageable by the locking ring when the nut is inserted into the bore at the opposite end of the body, the bushing being rotatable to align its eccentric opening with the opening for the nut in releasing the nut from the body.

5. In a nut lock of the class described, a body having opposite cylindrical bores, locking means in one of the bores, a bushing with an eccentric opening mounted in this bore and having its eccentric opening rotatable with the locking means to register with the opposite cylindrical bore for releasing a grooved nut engaged thereby.

6. In a nut lock, a body having opposite cylindrical bores, locking means secured in one of the bores, a locking bushing also rotatable with the locking means in the same bore, said bushing having a locking ring at its inner end for engaging a grooved nut inserted in the opposite bore of the body, and a spring pressed plate mounted within the bushing and pressed against the ring.

7. The combination of a nut having a circular head and engagement groove, of a lock therefor comprising a body with opposite eccentric bores, one adapted to receive the nut, locking means in the other bore of the body including a transverse driving member, a bushing mounted in this bore having notches engaged by the driving member for rotating the bushing, the bushing having an eccentric opening at its inner end providing an eccentric locking ring for engaging the groove of the nut and movable with the locking means to substantially coincide with the bore of the nut to release the nut therefrom, and a spring-pressed plate mounted within the bushing and operative to force the nut from the bushing when the locking ring is rotated to coincide with the bore of the nut.

CLARENCE P. KRAMER.